April 28, 1970  R. F. GERHARDT  3,509,087
INK COMPOSITION
Filed July 12, 1967
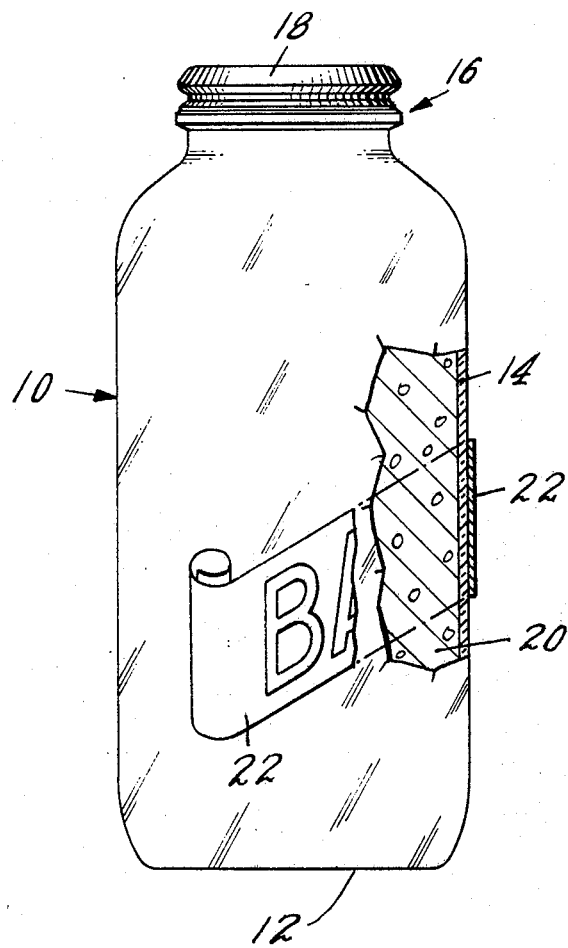
INVENTOR.
ROBERT FRANK GERHARDT
BY
Robert P. Auber
ATTORNEY United States Patent Office 3,509,087
Patented Apr. 28, 1970

3,509,087
INK COMPOSITION
Robert Frank Gerhardt, Deer Park, N.Y., assignor to M & T Chemicals, Inc., New York, N.Y., a corporation of Delaware
Filed July 12, 1967, Ser. No. 652,751
Int. Cl. C08k 1/24; C03c 17/32
U.S. Cl. 260—33.6                              8 Claims

ABSTRACT OF THE DISCLOSURE

An ink composition for application to a non-absorbent surface such as the outside of a glass container which ink when hardened provides on the container a decoration or label of a pigmented film forming resin which will withstand the conditions required for processing a food packed in the container.

Background of the invention

This invention has utility in decorating or labeling, by means of the silk screen process, a non-absorbent surface, i.e. one into which the ink does not penetrate as would happen with paper or cloth. It has particular utility in decorating or labeling the outside surface of single use, i.e. non-returnable, glass containers, although it can also be used on metal or plastic, where the labeled container, after receipt by a packer, is packed with some product, usually a food product, and the packed product is cooked in the now-sealed container by immersing the filled and sealed container in hot water, usually under pressure in a retort or autoclave so that the water is superheated, for from 15 minutes to an hour or more. The cooking of a food product in its sealed container is known in the art as processing.

Examples of such foods processed in their containers are fruits and vegetables, baby foods, certain chocolate and milk containing soft drinks, pet foods, and the like. The most usual way of decorating and labeling such foods is by means of a paper label adhered to the outside surface of the container after processing. However, the ink of the present invention is a unique improvement over paper labeling and over other organic film decoration or labeling, it provides aesthetic effects not obtainable with paper labeling and it provides the packer with this convenience and economy of not having to decorate or label his packed containers after processing.

Summary of the invention

The ink composition of the present invention comprises a polyvinyl acetal resin as the essential film former, a pigment to provide the resin film with the desired color, a substituted or unsubstituted aromatic hydrocarbon which acts as a solvent and/or liquid vehicle for the non-volatiles at elevated temperatures but provides the composition with rapid cold-set properties at the temperature of the surface being labeled, and certain additives to enable the film to maintain its integrity and adhesion to a container surface during and after the processing of a product packed in the container.

Description of the drawing

The figure is an elevational view of a labeled, packed and sealed glass-jar in which a product has been processed.

Description of the preferred embodiments

The polyvinyl acetals useful in the ink of the present invention are polyvinyl formal, polyvinyl acetal and polyvinyl butyral, each of which contains from 6% to 22% hydroxyl calculated as polyvinyl alcohol. Preferred from this group is polyvinyl butyral, especially that containing 8% to 15% hydroxyl. Polyvinyl acetals having a hydroxyl content above the maximum impart too great a water sensitivity to the finished ink film whereas a resin having a hydroxyl content below the specified minimum will not be sufficiently reactive with other of the non-volatiles thereby reducing the toughness and adhesion of the ink film. The polyvinyl acetal resin is present in the ink composition in an amount of, by weight, from 20 to 25%, and preferably about 22% of total ingredients, volatile and non-volatile.

The term pigment as used herein is meant to include any coloring medium whether it is and remains an insoluble particulate pigment or is a soluble dye. The only requirements for the pigment are that it impart the desired color, and opacity if that is desired, uniformly to the final ink film. Examples of such pigments are titanium dioxide for white, carbon black for black, chrome green for green and phthalocyanine blue for blue. Since dyes, i.e. dissolved colorants, tend to produce transparent colors and in most instances a label or decoration requires opacity, the pigment most usually will be an insoluble, particulate colorant. Depending upon the results desired, e.g. intensity, opacity, and the specific gravity of the pigment, the weight of pigment will vary. Therefore, the weight percentage of pigment in the subject ink is left to the determination of those skilled in the art. Further, the weight percentage disclosed for the other ingredients in the ink is based on a total composition weight minus the pigment.

The aromatic hydrocarbon volatile vehicle has a definite melting point; is solid at the temperature of the surface to be labeled which most usually will be the ambient temperature surrounding this surface, e.g. room temperature; has a melting point in the range of from 35° C. to 150° C.; when it is in its heated liquid state, it dissolves the polyvinyl acetal resin; and in its cooled, solid state it has little or no solvent action on the vinyl resin; and has an appreciable vapor pressure at the baking temperature.

The aromatic compounds meeting the above requirements and having utility in the instant invention are diphenyl, which is preferred, 4,4'-dichlorodiphenyl, para dichlorobenzene, naphthalene, and substituted naphthalene, e.g. beta chloronaphthalene and 1,4-dichloronaphthalene, acenaphthylene and acenaphthene. These substituted and unsubstituted aromatic hydrocarbons are present in the instant composition in varying amounts depending upon the melting point desired for the compositions as will be explained more fully hereinafter. Diphenyl is very much preferred as the vehicle because of its rapid solidification rate and because its melting point is optimum for silk screen operations.

The following ingredients of the ink are considered reactive ingredients in that each appears to react either with one or more of the others and/or with the polyvinyl acetal resin, probably with the hydroxyl groups therein.

Within this group of reactive ingredients, a polymethylol phenol ether is present in greatest proportion, from 0.75% to 1.5% and preferably about 1.3% by weight of the total weight of the ink. Such phenol ethers are described in U.S. Patent 2,579,330; and from among those disclosed, the present invention utilizes the soluble and fusible 1-alkenyl or halogenated alkenyl ethers of the polymethylol phenol. Specifically preferred is 1-allyloxy-2,4,6-trimethylol benzene.

Next in percentage concentration is a lower alkoxy silane, preferably gamma-glycidoxypropyl-trimethoxy silane. While not wishing to be bound by any particular theory, it is believed that the silane performs a bridging or binding function between the surface of the glass and the ink film, one portion of the silane molecule attaching itself to the glass surface and another portion of the molecule being attached to one or more components in the ink film thereby adhering the ink film to the glass. The amount of silane in the ink composition need not be great, being from 0.3% to 0.6% and preferably about 0.4% by weight of total ingredients.

A small percentage, less than that of the silane, of a soluble and fusible melamine-formaldehyde resin is present in the ink composition to cooperate with the methylol phenol ether resin in toughening or curing the film. This resin probably reacts, at least partially, with hydroxyl groups in the polyvinyl acetal resin since, without the melamine-formaldehyde resin present, the ink film blushes, i.e. it whitens, indicating water sensitivity.

Another reactive ingredient in the ink composition is an acid catalyst for the phenol ether and the melamine-formaldehyde resins. Phosphoric acid or phosphoric acid yielding compounds has been found well suited for this function. However, to provide the ink composition with stability, i.e. prevent gelation or pigment flocculation, it is preferred to use a compound which releases the phosphoric acid at the braking temperature of the applied ink, i.e. a latent catalyst. Preferred as such a latent catalyst is an amine salt of phosphoric acid. Although any primary, secondary or tertiary aliphatic amine salt of ortho, meta or pyrophosphoric acid may be used, preferred is monodibutyl-amine pyrophosphate.

Both the melamine-formaldehyde and the acid catalyst are present in the ink composition in about the same amounts, both being less than the amount of silane. These two ingredients are present in an amount, by weight, of from 0.10% to 0.20% and preferably about 0.15% of the total weight of ink composition.

The following examples are by way of explanation and are not to be construed as limiting the invention.

EXAMPLE I

Each of the ink compositions in these examples was compounded in the same manner as follows:

A portion of the polyvinyl acetal resin, about 10% was dissolved in liquid solvent in a suitable vessel. To this solution was added the pigment; and the resulting paste was ground on a 3-roll mill. The aromatic hydrocarbon solvent-vehicle was heated to about 220° F. to melt and liquify the same; and this liquid is added to the resin- pigment paste with agitation in a Hockmeyer or Cowles mixer. Thereafter, while maintaining the elevated temperature, the remainder of polyvinyl acetal resin was added and agitation or mixing continued until the resin was dissolved, after which the reactive ingredients were added while maintaining the heat and mixing. The heated, homogeneous ink composition was then poured into suitable containers and allowed to cool and solidify for subsequent use.

EXAMPLE II

| Material: | Parts by weight |
|---|---|
| Polyvinyl butyral containing about 12% polyvinyl alcohol [1] | 105 |
| Liquid solvent (butyl Cellosolve) | 52 |
| TiO$_2$ pigment | 90 |
| Biphenyl | 300 |
| 1-allyloxy-2,4,6-trimethylol benzene | 6 |
| A stage butylated melamine-formaldehyde [2] | .75 |
| Monodibutylamine pyrophosphate | .6 |
| Gamma-glycidoxypropyl-trimethoxy silane | 2.0 |

[1] Butvar B–76 sold by Monsanto Chemical Co.
[2] Cymel 245–8 sold by American Cyanamid Co.

This composition has a melting point of about 142° F.; and is used as a first-down white ink.

EXAMPLE III

| Material: | Parts by weight |
|---|---|
| Butvar B–76 (as above) | 105 |
| Liquid solvent (1 part butyl Cellosolve to 1.5 parts Solvesso 150) | 150 |
| Molybdate orange pigment | 80 |
| Watchung red pigment | 24 |
| Biphenyl | 210 |
| 1-allyloxy-2,4,6-trimethylol benzene | 6 |
| Cymel 245–8 (as above) | 0.75 |
| Monodibutylamine pyrophosphate | 0.6 |
| Gamma-glycidoxypropyl-trimethoxy silane | 2.0 |

This composition has a melting point of about 98° F.; and is a second-down red ink.

EXAMPLE IV

This example describes the application of a first-down white ink, i.e. Example II, and a second-down red ink, i.e. Example III, adjacent the white ink in rapid succession. The red ink is applied in a different pattern from the white ink.

Pieces of the two solid inks are melted in separate suitable vessels, each to a temperature 10° to 20° F. above the upper limit of their respective melting points. The molten mixtures are then poured onto separate heated screens in a standard silk screen printing machine wherein each screen is maintained at about the temperature of the molten ink thereon. While on the heated screens the inks have a soft, melted-butter-like consistency; and are thixotropic. The inks, first the white and within a second or so thereafter the red adjacent the white, are then screened onto the arcuate surface of a 12 oz. beverage bottle having a surface temperature of about 70° F. at a rate of sixty bottles per minute. Depending upon the particular silk screen printing machine used, the inks may be applied at higher rates, e.g. 200 bottles per minute. Each ink sets or solidifies in a fraction of a second upon contacting the surface to which it was applied. The bottle thus decorated is thereafter baked for about 10 minutes at about 400° F. during which time, in each ink film, the diphenyl remelts, refluidizing the composition, permitting sufficient flow-out to form smooth even films but still maintaining the definition of each print without sag or bleeding of one color into the other. Upon continued heating of the films during the baking operation, the now liquid diphenyl is volatilized and removed from the composition, as is the liquid solvent; and the vinyl acetal resin and reactive ingredients interact so that at the end of the bake a red and white pattern, each substantially diphenyl-free, remains on the bottle surface. Subsequent cooling of the now decorated bottle toughens the decoration and anchors it securely to the bottle.

The compositions of the instant invention have utility both as a first-down ink, i.e. the ink applied to the substrate first; and as a subsequent down ink, i.e. the ink applied second or third or fourth, etc. contiguous to the previously down ink. The essential difference between first and subsequent down inks is that the first down ink has the highest melting point or range and the melting point or range of each subsequent down ink is lower than its predecessors. In other words, the second down ink has a lower melting point than the first down ink; the third down ink has a lower melting point than the second down ink; and so forth. By this means, the subsequent down inks are applied at a lower temperature than their predecessors and therefore do not remelt the previously applied ink upon contacting it thereby obviating smearing or offsetting the previously applied ink.

At temperatures moderately above its melting point, the ink is sufficiently fluid to pass through the screen and to print, but not so hot as to cause excessive evaporation of the solvents; and at a temperature slightly below its melting point, the ink is substantially solid but still somewhat tacky. Therefore, for silk screen application of the inks, the screens are maintained about 10 to 20° F. above the melting point. The ink becomes a non-tacky solid a few degrees, e.g. about 5° F., below the melting point. It will be noted that there is sufficient leeway between the melting point of proximate down inks so that the subsequent down ink does not remelt or appreciably soften its predecessor.

In general, melting point lowering is accomplished by increasing the amount of dissolved resin solids relative to the aromatic hydrocarbon vehicle. This is preferably done by decreasing the percentage of aromatic hydrocarbon vehicle from that used in a previous down ink. Liquid organic solvent is added to the composition to make up for at least part and preferably all of the aromatic hydrocarbon vehicle reduction. For example, in the last down ink, the aromatic hydrocarbon vehicle can be omitted and the solvent-dispersant for the non-volatiles can be composed totally of a suitable, normally liquid organic solvent such as a mixture of xylol and lower alkyl ketone. It will be noted from Example II that even the first-down ink contains a small percentage of normally liquid solvent. The purpose of this is to dissolve a portion of the polyvinyl butyral resin to provide a liquid medium in which to grind the pigment for the composition.

To provide the desired fluidity at application temperatures, the inks of the present invention contain from 70 to 80% and preferably about 75%, by weight, of solvent. This amount of solvent is the sum of the amounts of liquid solvent and aromatic hydrocarbon vehicle. To provide the decreasing melting point effect for subsequent down inks, the solvent for the first down ink contains 80% or more of aromatic hydrocarbon vehicle. For each subsequent down ink, this amount of vehicle is reduced about 20 to 30%, which reduction is made up with liquid solvent, with the understanding, however, that the solvent for the last down ink may be all liquid solvent. For example, in the examples previously given, the first down ink has a vehicle/liquid solvent ratio of about 85/15; and in the second down, this ratio is about 60/40. If a third and last down ink were applied, it could contain all liquid solvent or it could have a vehicle/liquid solvent ratio of about 40/60.

The drawing shows a flint glass container, i.e., bottle or jar, generally designated 10, having an integral bottom 12, a side wall 14 and a dispensing end 16 closed and sealed with a cap 18 in a manner well known in the art. Inside the container 10 is a food product 20, such as a chocolate-milk mixture soft drink, which requires processing in order to preserve, over an extended period of time, i.e., over a year, its edibility.

Adhered to the outside surface of the side wall 14 is a pigment synthetic resin label 22. The label 22 is formed from the ink compositions and applied in the manner described hereinbefore prior to filling and sealing the container 10 and processing the food product in the filled and sealed container.

Pigmented synthetic resin labels of the instant invention have been subjected to under-water processing at 240° F. for 20 minutes without appreciable loss of adhesion or damage; and in many instances have maintained adhesion and integrity after underwater processing for 60 minutes at 250° F.

It is thought that the invention and many of its attendant advantages will be understood from the foregoing description and it will be apparent that various changes may be made in the matter of the ingredients, the identity and the proportions of the formulation, and that changes may be made in the form, construction and arrangement of the parts of the article without departing from the spirit and scope of the invention or sacrificing all of its material advantages, the form hereinbefore described being merely a preferred embodiment thereof.

I claim:
1. An ink composition for application to a non-absorbent surface and adapted to remain adherent to said surface after immersion in hot water for periods in excess of 15 minutes, comprising by weight:
  about 75% of a solvent selected from the group consisting of an aromatic hydrocarbon vehicle having a melting point at atmospheric pressure in the range of 35° C. to 150° C. and a vapor pressure at 400° F. of at least 40 mm. of mercury and a mixture of said vehicle and a normally liquid organic solvent;
  from 20 to 25% of a thermoplastic polyvinyl acetal resin having from 6% to 22% combined hydroxyl measured as polyvinyl alcohol;
  from 0.75% to 1.5% of a polymethylol phenol ether;
  from 0.10% to 0.20% of a soluble and fusible melamineformaldehyde resin;
  from 0.3% to 0.6% of a lower alkoxy silane;
  from 0.10% to 0.20% of a catalyst selected from the group consisting of a phosphoric acid and a phosphoric acid liberating salt; and
  sufficient pigment to provide said ink with a pre-determined color, the percentages in said composition not including the amount of said pigment.

2. The ink composition set forth in claim 1, wherein said vehicle is biphenyl.

3. The ink composition set forth in claim 1 wherein said polyvinyl acetal resin is polyvinyl butyral having 8% to 15% combined hydroxyl.

4. The ink composition set forth in claim 1 wherein said ether is 1-allyloxy-2,4,6-trimethylol benzene.

5. The ink composition set forth in claim 1 wherein said melamine-formaldehyde resin is butylated.

6. The ink set forth in claim 1 wherein said silane is gamma glycidoxypropyl-trimethoxy silane.

7. The ink set forth in claim 1 wherein said catalyst is monodibutylamine pyrophosphate.

8. An ink composition for application to the exterior surface of a glass container and adapted, after baking, to remain adhered to said surface after immersion in hot water for periods in excess of 15 minutes, comprising by weight:
  from 20 to 25% of polyvinyl butyral containing 8 to 15% combined hydroxyl;
  from 0.75 to 1.5% of 1-allyloxy-2,4,6-trimethylol benzene;
  from 0.3 to 0.6% of gamma-glycidoxypropyl-trimethoxy silane;
  from 0.10 to 0.20% of a soluble and fusible butylated melamine-formaldehyde resin;
  from 0.10 to 0.20% of monodibutylamine pyrophosphate;
  about 75% of a solvent selected from the group consisting of biphenyl and a mixture of biphenyl and a normally liquid organic solvent; and
  sufficient pigment to provide said ink with a predetermined color, the percentages in said composition not including the amount of said pigment.

References Cited

UNITED STATES PATENTS 2,254,072   8/1941   Jenkins.
2,917,482   12/1959   Lavin.
3,317,369   5/1967   Clark _____ 260—448.2

MORRIS LIEBMAN, Primary Examiner

P. R. MICHL, Assistant Examiner

U.S. Cl. X.R.

260—33.8; 117—124, 132